United States Patent [19]

Sainen

[11] Patent Number: 4,893,250

[45] Date of Patent: Jan. 9, 1990

[54] CENTRALIZED LOOM CONTROL METHOD WITH OPTIMIZATION OF OPERATING SPEED

[75] Inventor: Tsutomu Sainen, Kanazawa, Japan

[73] Assignee: Tsudakoma Corp., Ishikawa, Japan

[21] Appl. No.: 329,638

[22] Filed: Mar. 28, 1989

[30] Foreign Application Priority Data

Mar. 28, 1988 [JP] Japan .................................. 63-073639

[51] Int. Cl.$^4$ ....................... G06F 15/46; D03D 51/00
[52] U.S. Cl. ..................................... 364/470; 364/148; 139/1 R
[58] Field of Search ........................ 364/148, 468, 470; 139/1 R

[56] References Cited

U.S. PATENT DOCUMENTS 4,736,324  4/1988  Sainen et al. ........................ 364/470

Primary Examiner—Jerry Smith
Assistant Examiner—James J. Kulbaski
Attorney, Agent, or Firm—Wenderoth, Lind & Ponack

[57] ABSTRACT

A centralized loom control method employing a host computer for controlling the operation of a plurality of looms. Data base including data accumulated by recording past actual weaving conditions in stored in a memory device connected to the host computer. The host computer determines standard set value for which the looms are to be set by processing the specifications of a fabric to be woven entered therein and data fetched from the memory device through predetermined calculation or interpolation. The host computer compares a standard operating speed among the standard set values with a target operating speed at which the loom is to be operated, and changes the standard set values according to the result of comparison to provide new standard set values suitable for operation at the target operating speed.

3 Claims, 10 Drawing Sheets

FIG.6
| WEFT COUNT | PRESSURE |
|---|---|
| $b_1$ | $p_1$ |
| $b_2$ | $p_2$ |
| $b_i$ | $p_i$ |
| $b_n$ | $p_n$ |
FIG.8
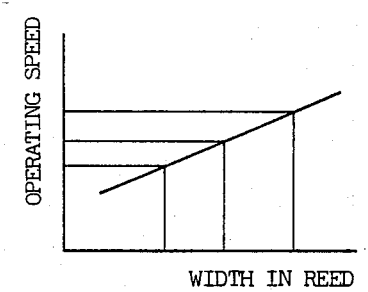
FIG.7
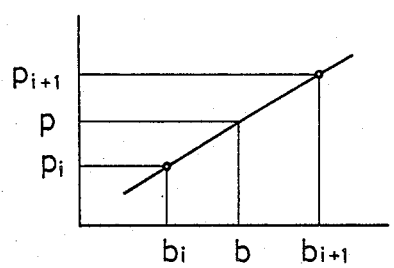
FIG.9
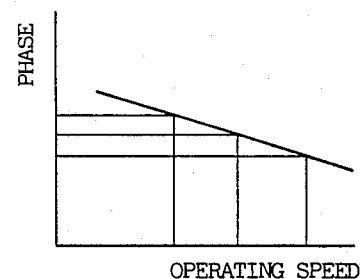

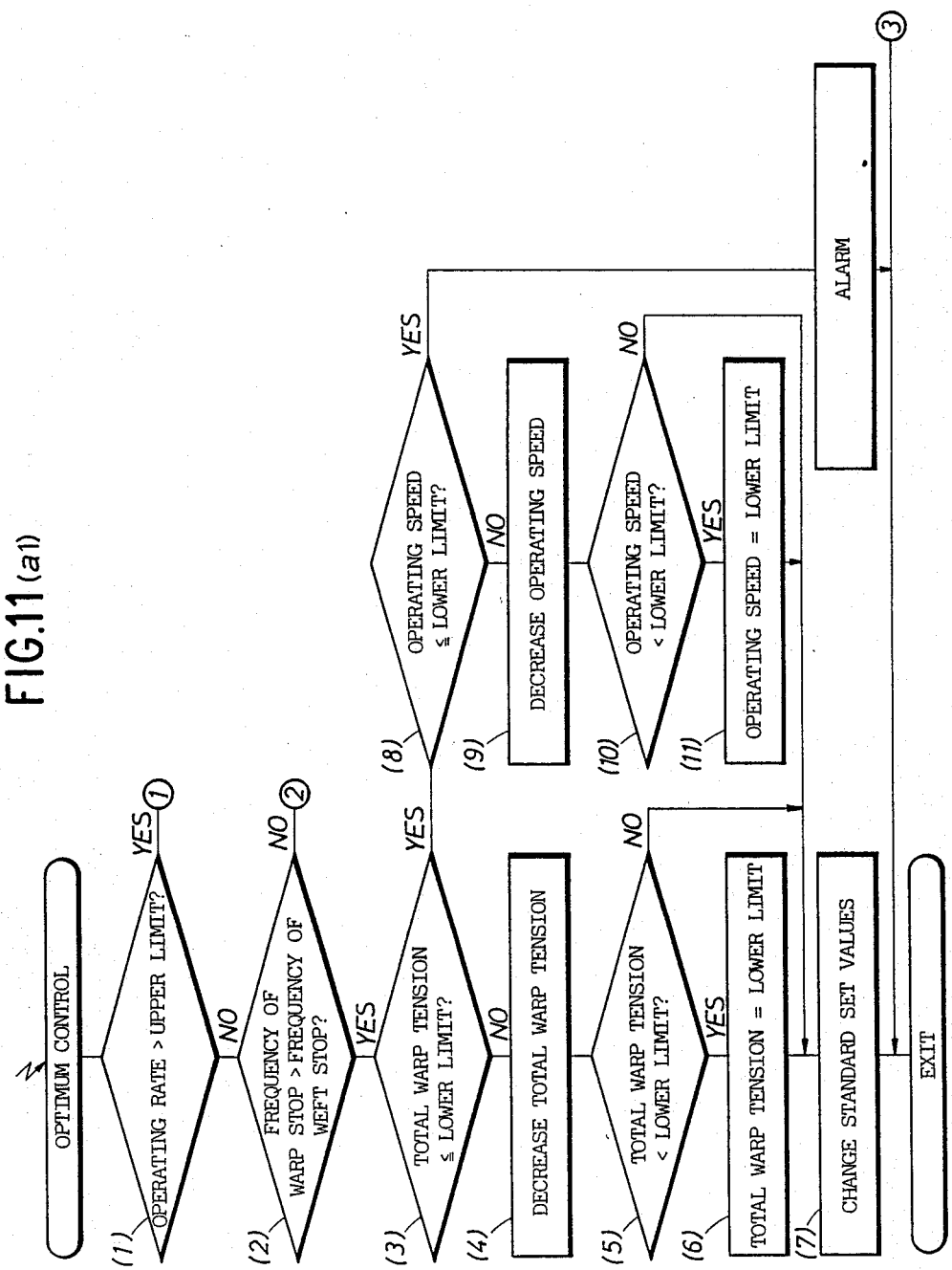

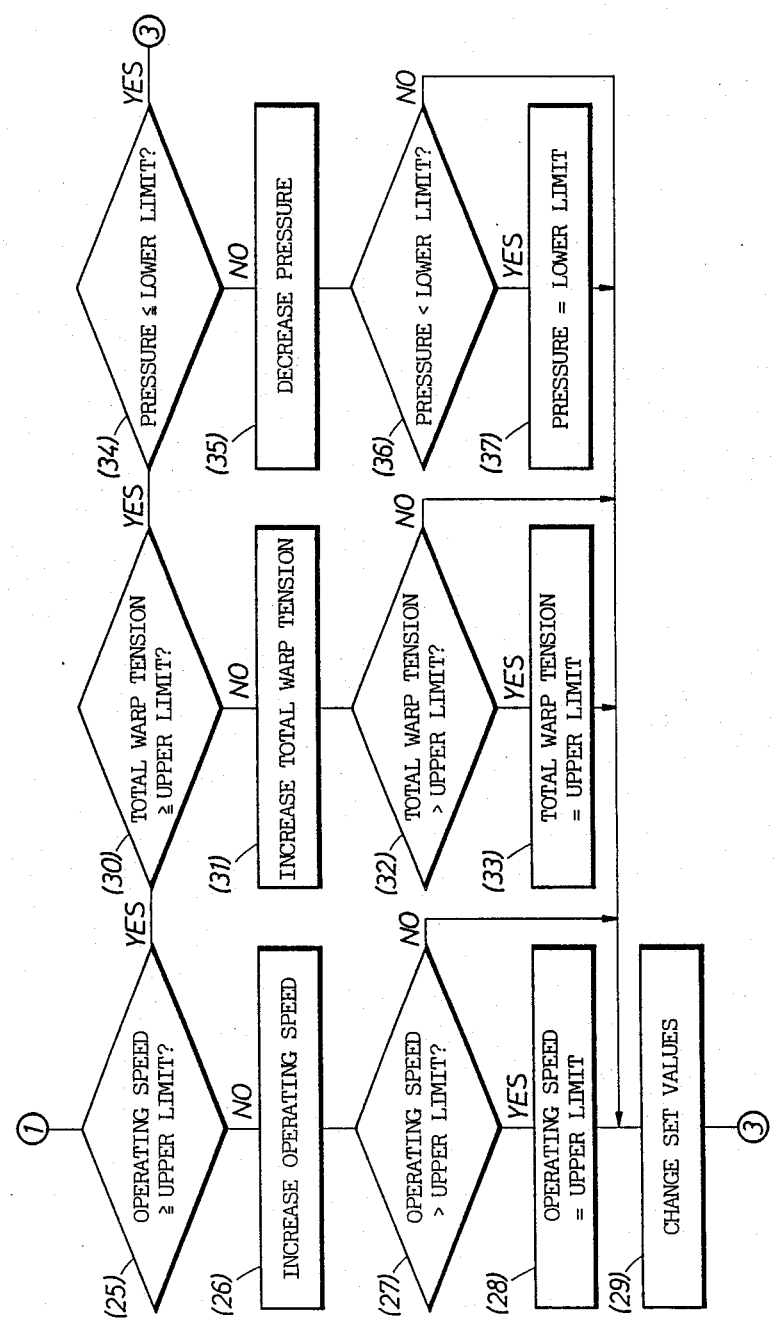

CENTRALIZED LOOM CONTROL METHOD WITH OPTIMIZATION OF OPERATING SPEED

BACKGROUND OF THE INVENTION

1. Field of the Invention

The present invention relates to a centralized loom control method and, more particularly, to centralized loom control techniques for quickly deciding control conditions meeting weaving conditions appropriate for weaving a new fabric of specifications, such as the total number of warp ends, pick spacing, the type and count of yarns.

2. Prior Art

Optimum loom control conditions are decided through test weaving on a test loom before weaving fabrics of new specifications. In the test weaving, a plurality of control parameters, such as the operating speed of the main shaft of the test loom, warp tension, operating phases of the retaining pin of the weft measuring and storing device and picking nozzles, and the pressure of a picking fluid (air), are varied to find optimum conditions. The test weaving is carried out to decide optimum weaving conditions by a trial-and-error method, in which tentative weaving conditions are decided on operator's experience and intuition, the results of test weaving under the tentative weaving conditions are evaluated, and the tentative weaving conditions are adjusted to better weaving conditions However, the trial-and-error method requires much time and labor, and skill. Such a troublesome procedure of deciding weaving conditions is an impediment particularly to rapidly supplying fabrics of new specifications to the market requiring rapid supply of diversified fabrics.

The inventors of the present invention proposed a method and apparatus for correcting the tentative weaving conditions in U.S. Pat. No. 4,736,324 (EPO Application No. 85 114 810.6). This proposed method stores data of weaving conditions collected in the past weaving operations in a computer, enters data of specifications of a fabric to be produced, decides standard weaving conditions with reference to the data stored in the computer, gives the standard weaving conditions to a loom, operates the loom under the standard weaving conditions, measures parameters indicating the condition of weaving operation, and corrects the standard weaving conditions on the basis of data obtained by measuring the parameters.

However, the advancement of weaving techniques is not taken into consideration in the invention proposed in the previous patent application. Suppose that an advanced loom is capable of operating at an operating speed higher than an optimum operating speed for at obsolete loom determined on the basis of data obtained and accumulated by measuring the operating conditions of such an obsolete loom in weaving the same fabric. Thin, the standard operating speed is lower than the optimum operating speed for the advanced loom, and hence improvement in productivity cannot be achieved by the advanced loom even though the standard operating speed is corrected automatically within a narrow range of correction by the learning function of the control unit of the loom.

SUMMARY OF THE INVENTION

Accordingly, it is an object of the present invention to provide a centralized loom control method eliminating the drawbacks of the prior art and capable of properly correcting the standard weaving conditions decided on the basis of data of the past weaving conditions.

In one aspect of the present invention, data accumulated in the past is stored in a memory device incorporated into a host computer for controlling a plurality of looms, standard set values are, divided by processing the data fetched from the memory device and data representing the specifications of a fabric through a predetermined operation or an interpolative operation, and a standard operating speed and a previously entered target operating speed are compared to decide new standard set values suitable for operation at the target operating speed. Then, data obtained by monitoring the operation of the loom controlled on the basis of the new standard set values and a plurality of standard values for the optimum control of the loom are compared in order of priority of the standard values, and then the standard set values are corrected on the basis of the result of comparison.

In accordance with the present invention, upon the reception of the specifications of a fabric, the host computer decides standard set values automatically with reference to a large amount data obtained through the measurement of the past actual operating condition of looms, the looms are set for the standard set values, and then the host computer controls the looms collectively. Thus, the present invention omits the test weaving procedure and improves the efficiency of the looms.

Particularly, since standard set values suitable for operation at a target operating speed stored previously in the host computer are decided, the standard set values are corrected to provide new standard set values and the loom is set for the new standard set values, the loom is not set for an operating speed excessively lower than the possible operating speed of the loom. Consequently, the loom operates for weaving at an ideal operating speed meeting the performance thereof. Thus, the advancement of weaving techniques is reflected on setting the operating speed of the loom, so that the productivity of the loom is improved.

The above and other objects, features and advantages of the present invention will become more apparent from the following description taken in conjunction with the accompanying drawings.

BRIEF DESCRIPTION OF THE DRAWINGS

FIG. 6 is a table showing data of fabric and corresponding data for weaving operation stored in a data base;

FIGS. 7, 8 and 9 are graphs to assistance in explaining interpolation;

DETAILED DESCRIPTION OF THE PREFERRED EMBODIMENT

Figure 1:
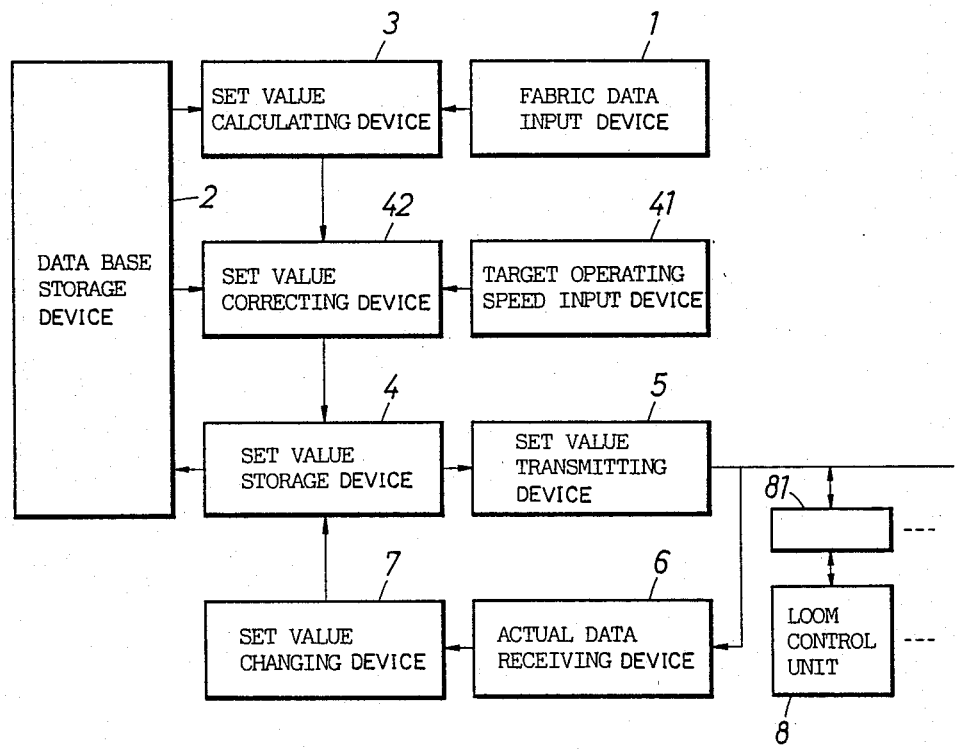
FIG. 1 is a block diagram of a centralized loom controller for carrying out a centralized loom control method embodying the present invention.

Referring to FIG. 1 showing a centralized loom controller for carrying out a centralized loom control method of the present invention, the centralized loom controller comprises, as principal components, a fabric data input means 1 for entering data representing the specifications of a fabric, a data base storage means 2 for storing a data base constructed by accumulating actual data obtained by recording data obtained by monitoring past actual weaving operation for fabrics of various kind, a set value calculating means 3 for processing fabric specifications entered by the fabric data input means 1 and actual data fetched from the data base storage means 2 through a predetermined operation to provide standard set values, a set value storage means 4 for storing new standard set values obtained on the basic of standard set values calculated by the set value calculating means 3 so as to meet a weaving operation at a target operating speed, a set value transmitting means 5 for transmitting the new set values to a plurality of loop control units 8 through transmitter-receiver means 81 connected respectively to the loom control units 8, an actual data receiving means 6 for receiving data representing the respective operating conditions of the looms and transmitted thereto through the transmitter-receiver means 81, and a set value changing means 7 for changing the standard set values stored in the set value storage means 4 on the basis of the actual data received by the actual data receiving means 6.

The centralized loom controller further comprises a target operating speed input means 41 and a set value correcting means 42. The set value correcting means 42 is connected to the data base storage means 2, the set value calculating means 3, the set value storage means 4 and the target operating speed input means 41. The set value correcting means 42 decides new set values appropriate for weaving operation at a target operating speed by correcting the standard set values calculated by the set value calculating means 3, and then gives the new set values to the standard set value storage means 4.

The centralized loom controller thus constructed carries out the centralized loom control method of the present invention to decide quickly weaving conditions suitable for weaving operation at a target operating speed.

Figure 2:
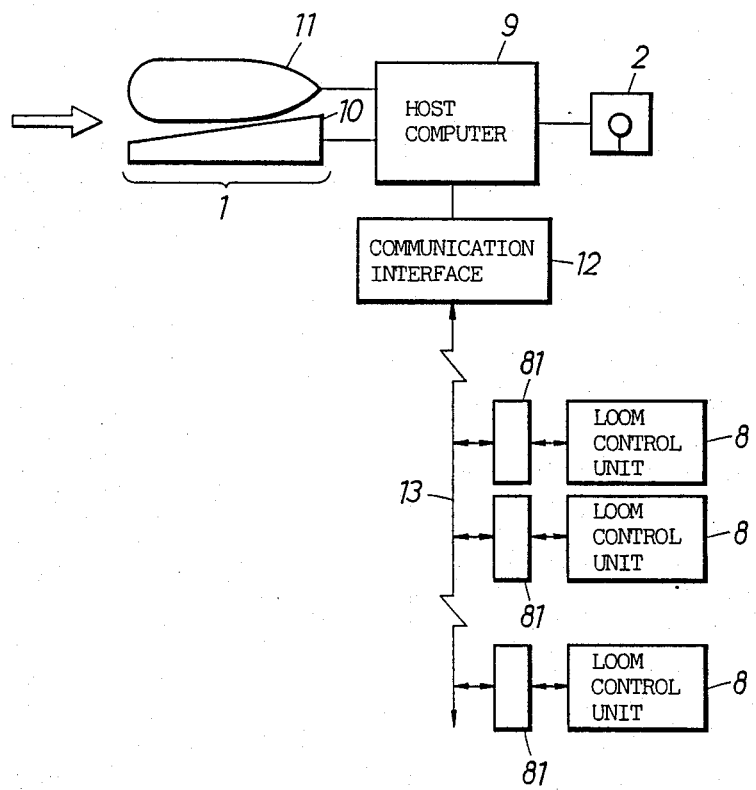
FIG. 2 is a block diagram of a system for executing a centralized loom control method in accordance with the present invention.

Referring to FIG. 2 showing the construction of the centralized loom controller for carrying out the centralized loom control method of the present invention, a host computer 9 for the centralized control of the plurality of loom control units 8 integrally has functions equivalent to those of the set value calculating means 3, the set value storage means 4, the set value changing means 7 and the set value correcting means 42 shown in FIG. 1. A key board 10 and a display 11, such as a CRT, connected to the host computer 9 serve as the fabric data input means 1 and the target operating speed input means 1. The data base storage device 2, such as a floppy disk, is an external storage device connected to the host computer 9. The plurality of loom control units 8 are connected through the transmitter-receiver 81, a bilateral bus 13 and a communication interface 12 to the host computer 9. The communication interface 12 comprises the set value transmitting device 5 and the actual data receiving device 6.

The operation of the centralized loom controller for weaving a fabric of new fabric specifications will be described hereinafter.

Figure 3:
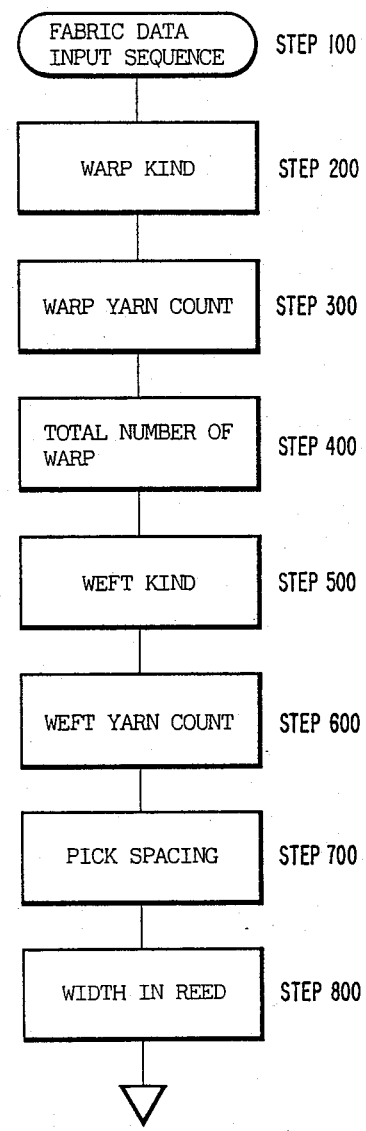
FIG. 3 is a flow chart of a fabric specification input procedure.

The keyboard 10 is operated in an interactive mode watching the display 11 to specify the number of the loom control unit 8 of an objective loom and to enter fabric specifications sequentially in the host computer 9 by a procedure as shown in FIG. 3. The fabric specifications include the kind of warp yarns, the yarn count (denier) of warp yarns, the total number of warp yarns, the kind of weft yarns, pick spacing, the yarn count of weft yarns and width in reed.

Upon the reception of the fabric specifications for a new fabric, the host computer 9 calculates standard set values with reference to the actual data stored in the data base storage device 2. The data base storage means 2 stores basic data and similar data prepared previously by recording the results of past actual weaving operation.

Figure 4A:
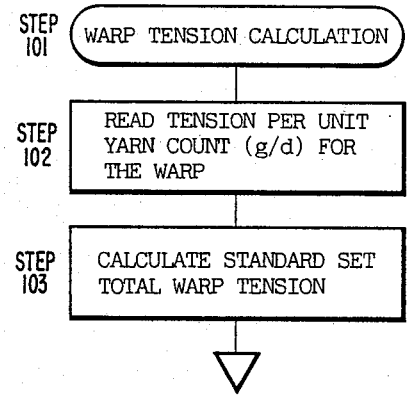
FIGS. 4(a), 4(b), 4(c) and 4(d) are flow charts of procedures respectively for calculating standard set values.
Figure 5A:
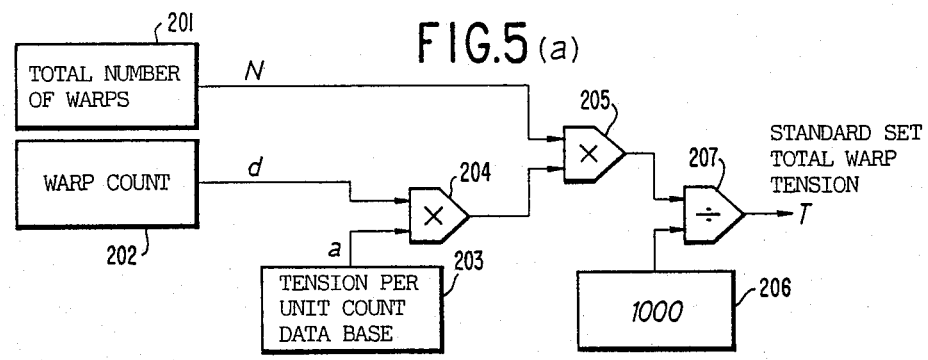
FIGS. 5(a), 5(b), 5(c) and 5(d) are functional block diagrams corresponding respectively to FIGS. 4(a), 4(b), 4(c) and 4(d)

Referring to FIGS. 4(a) and 5(a), snowing a procedure of calculating a standard total warp tension T (kg), a basic tension a (g/d) for a yarn of the same kind as that of warp yarns to be used is read from the data base storage device 2. Then, the standard total warp tension T is calculated by using an expression:

$$T\ (kg) = a\ (g/d) \times d\ (denier) \times N \times 1/1000$$

where d is the yarn count of the warp yarn expressed in denier and N is the total number N of the warp yarns, which are entered by operating the keyboard 10.

Figure 4B:
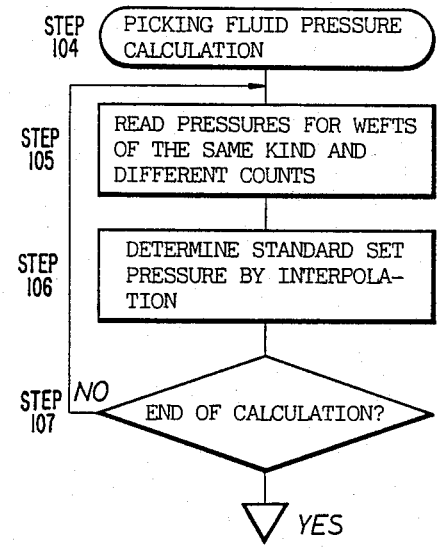
Figure 4C:
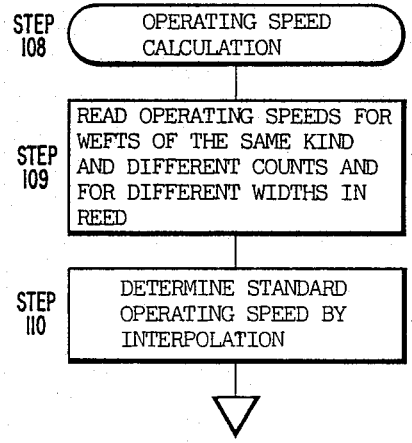
Figure 4D:
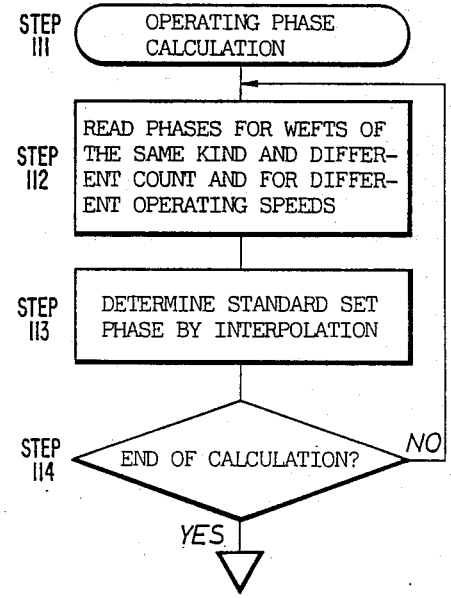
Figure 5B:
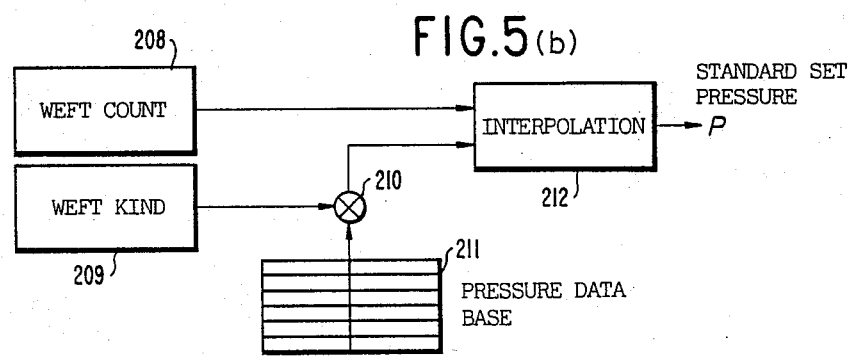
Figure 5C:
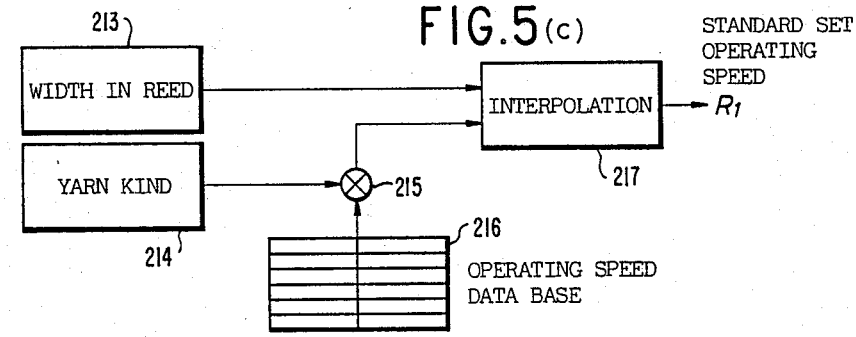
Figure 5D:
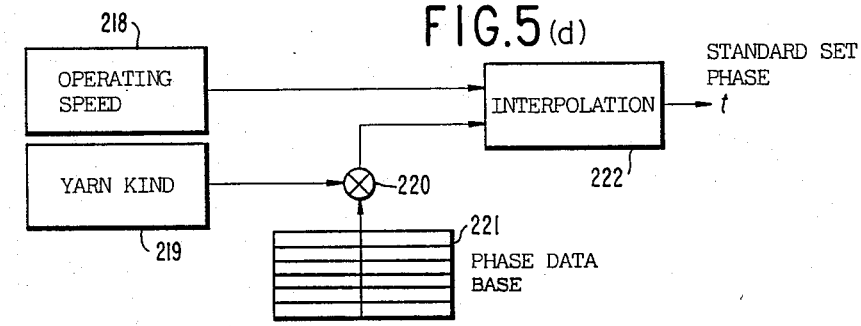

Referring to FIGS. 4(b) and 5(b) showing a procedure of calculating a standard pressure p for a picking fluid, a plurality of combinations of weft yarns of the same kind as that of the weft yarn to be used having yarn counts $b_i$ (i=1 to n) and corresponding pressures $P_i$(i=1 to n) as shown in FIG. 6 are read from the data base storage device 2, Yarn counts $b_i$ and $b_{i+1}$ and pressures $P_i$ and $p_{i+1}$ meeting an inequality: $b_i < b < b_{i+1}$ are selected, and then the standard pressure P is calculated through interpolation (FIG. 7) by using an expression:

$$P = P_i + (P_{i+1} - P_i)(b - b_i)/(b_{i+1} - b_i)$$

A standard operating speed $R_1$ and a standard picking phase t, namely, a phase at which an instruction to turn on or off a picking device is issued are calculated similarly through interpolation (FIGS. 8 and 9) by using actual data read from the data base storage device 2 by procedures shown in FIGS. 4(c) and 5(c) and FIGS. 4(d) and 5(d), respectively.

Other standard set values are calculated by similar procedures.

Figure 10:
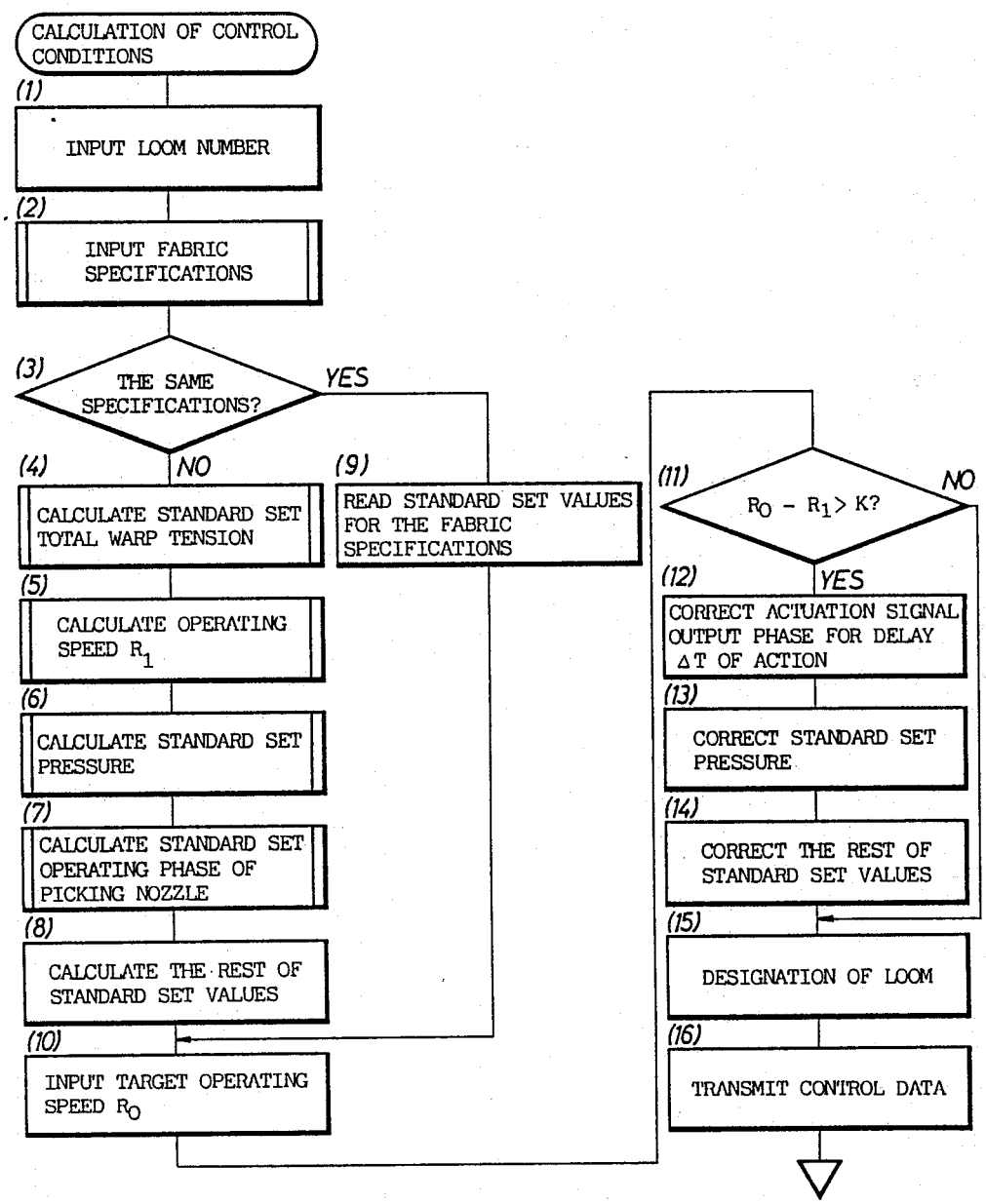
FIG. 10 is a flow chart of a control program to be executed by the centralized loom control method of the present invention.

FIG. 10 is a flow chart showing steps 1 to 10 of calculating the foregoing standard set values. In step 3, a decision is made if the same fabric specifications as the new fabric specifications entered in the host computer 9 are found in the data base stored in the data base storage device 2. When the decision in step 3 is affirmative, the standard set values corresponding to the fabric specifications are fetched from the data base storage device 2. In such a case, the procedures for calculating the standard set values are unnecessary, and hence steps 4 through 8 are skipped.

After the completion of steps 1 to 9, the target operating speed input device 41 is operated to give the host computer 9 a target operating speed $R_0$ or a target difference corresponding to the difference $\Delta R$ ($=R_0-R_1$, $R_1$ is the standard operating speed of the loom). Then, the host computer calculates the difference $\Delta R$. When $\Delta R < K$ (K is a constant), the standard set values are not changed. When $\Delta R \geq K$, standard set values dependent on the target rotating speed $R_0$, such as the standard picking phase t, the standard pressure P and the standard total warp tension T, are corrected accordingly. That is, since the rotating angle of the main shaft of the loom corresponding to a delay $\Delta T$ in the operation of the actuator is differentiated corresponding to the rotating speed of the loom, the standard picking phase t indicative of issuing an instruction signal to the actuator is changed according to the difference $\Delta R$ so that the phase of the completion of operation of the actuator is kept constant. The standard phase t is corrected by the change thereof and calculated by using an expression:

$$C=(\theta-\Delta\theta)$$

where $\Delta\theta(\text{degree})=360\times\Delta R\times\Delta T$ (sec), C is correction. The pressure is determined by defining the relation between standard pressure P and rotating speed R by a regression function and correcting the standard pressure P by $P=k\times R+P_0$. Other standard set values to be corrected according to the operating speed other than those relating to picking conditions, such as stop signal output phase, are corrected by a similar procedure. Thus, the standard set values are corrected in steps 10 through 14. Then, in steps 15 and 16, the host computer 9 gives sequentially control signals representing the corrected standard set values through the communication interface 12 and the bilateral bus 13 to the loom control unit 8 of the loom assigned to weaving the fabric.

Then, the loom control unit 8 sets the loom for weaving conditions corresponding to the corrected standard set values represented by the control signals specifying the new fabric specifications and the operating speed The operation of the centralized loom controller for the optimum control of the loom will be described hereinafter.

Reference values for optimum control, namely, reference upper and lower limits of factors of optimum control, are entered sequentially in the host computer 9 in order of priority, for example, in order of (1) a reference operating rate, (2) a reference operating speed, (3) a reference total warp tension and (4) a reference pressure. The reference lower limit for operating rate having the highest priority may be omitted. After the loom has been set for the standard set values and started, the transmitter-receiver means 81 of the loom control unit 8 of the loom sends data representing the actual operating conditions of the loom through the bilateral bus 13 and the communication interface 12 to the host computer 9.

The host computer 9 sequentially compares the data representing the actual operating conditions of the loom and the reference values for optimum control given thereto in order to priority, and then corrects the standard set values with reference to the result of comparison.

Ordinarily, such a series of procedures for optimum control is carried out by the set value changing, device 7 and the set value storage device 4 included in the host computer 9. However, when a microcomputer incorporated into the loom control unit 8 has a margin for control capacity, the series of procedures may be carried out by the loom control unit 8, in which the microcomputer of the loom control unit 8 executes a control program for optimum control in cooperation with the host computer 9.

Figure 11B:
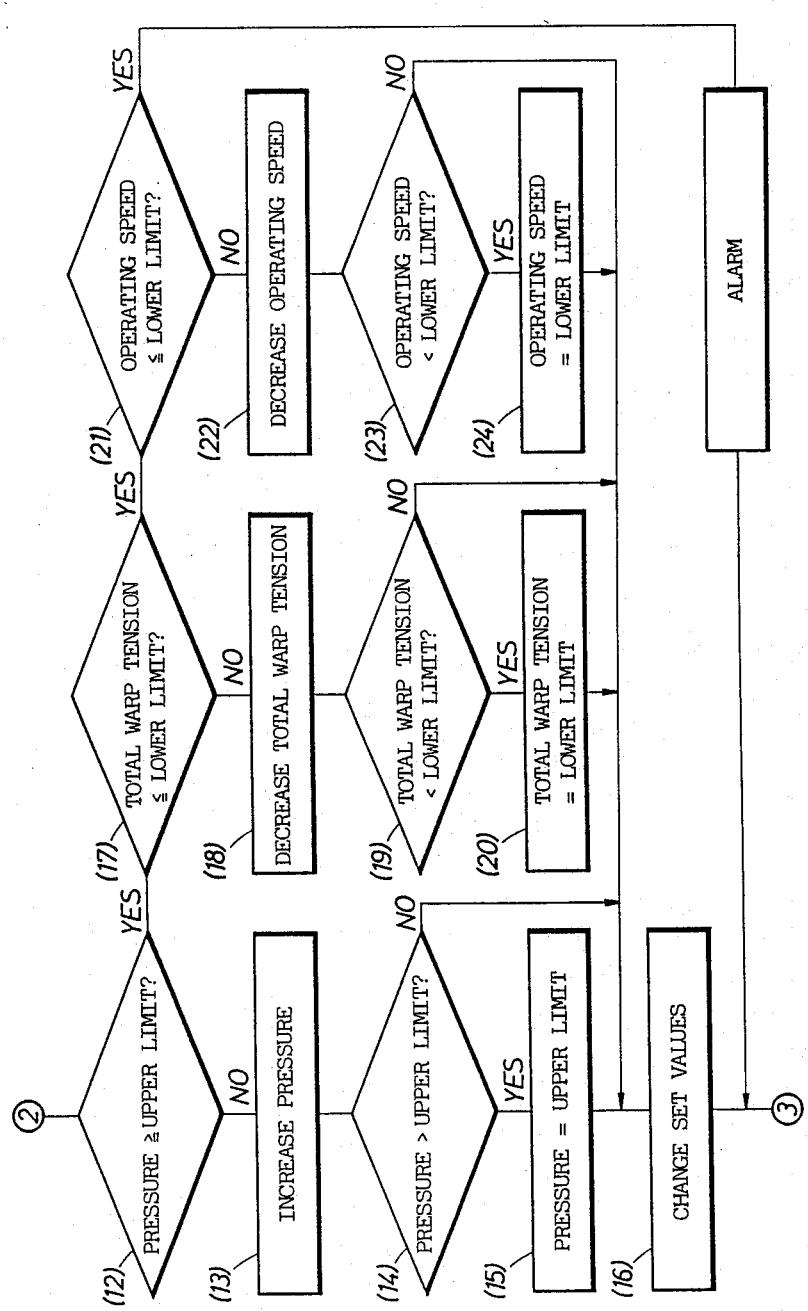
FIGS. 11(a1), 11(a2) and 11(b) are flow charts of an optimum control operation.

FIGS. 11(a) and 11(b) are flow charts showing steps of procedures for optimum control, which are repeated periodically.

Suppose that the operating rate of the loom is excessively lower than the reference operating rate, i.e., a reference value having the highest priority, owing to highly frequent stoppage of the loom due to warp breakage, that is, a decision in step 1 is negative and a decision in step 2 is affirmative. Then, in steps 3 through 7, the standard set values of total warp tension having the third priority is reduced to a value not less than the lower limit of total warp tension. If the actual operating rate still falls short of the reference operating rete, the reference operating speed, i.e., a reference value having the second priority, is lowered to a value not less than the lower limit of operating speed in steps 8 through 11.

When the operating rate of the loom is excessively lower than the reference operating rate owing to highly frequent stoppage of the loom due to faulty picking, that is, when both the decisions in steps 1 and 2 are negative, the reference pressure of the picking fluid, i.e., a reference value having the fourth priority, is increased to a value less than the upper limit of the pressure in steps 12 through 16, and then the reference total warp tension, i.e., a reference value having the third priority, is reduced to a value not less than the lower limit of total warp tension in steps 17 through 20 and 16. If the operating rate still falls short of the reference operating rate, the operating speed having the second priority is lowered further to a value not less than the lower limit in steps 21 through 24 and 16.

On the contrary, when the operating rate is very high, namely, when the decision in step 1 is affirmative, the operating speed and the total warp tension are increased to values which will not reduce the operating rate below the lower limit of the reference operating rate in steps 25 through 33. When the loom is still able to operate without trouble, the reference pressure is decreased in steps 34 through 37 and 29. In steps 30 to 33, the choice of either the upper limit or the lower limit as the optimum value is decided in entering the reference value in the host computer 9. In this embodiment, the upper limit of the reference total warp tension is chosen as an optimum value.

Although the invention has been described in its preferred form with a certain degree of particularity, it is to be understood that many variations and changes are possible in the invention without departing from the scope thereof.

What is claimed is:

1. A centralized loom control method to be carried out by a centralized loom control system comprising a host computer, memory means connected to the host computer, and a plurality of loom control units which are controlled by control signals given thereto from the host computer; comprising steps of:
   storing a data base including data accumulated by recording past actual weaving conditions in the memory means;
   entering data representing the specifications of a fabric to be woven in the host computer;

deciding whether or not standard set values for a fabric of the same specifications as these of the fabric to be woven are stored in the memory means;

reading the standard set values from the memory means when the standard set values for the fabric to be woven is stored in the memory means or reading standard set values for fabrics of specifications approximately similar to those of the fabric to be woven from the memory means;

determining standard set values for the fabric to be woven by processing the standard set values for fabrics of specifications approximately similar to those of the fabric to be woven through predetermined calculation or interpolation;

comparing a standard operating speed among the standard set values with a target operating speed of a loom on which the fabric is to be woven and changing the standard set values according to the result of comparison for a new standard set values suitable for weaving operation at the target operating speed; and giving a control signal to the loom control units to operate the looms controlled respectively by the loom control units at the new standard operating speed.

2. A centralized loom control method according to claim 1, wherein the standard set values determined by the host computer includes a standard total warp tension.

3. A centralized loom control method according to claim 1, wherein the new standard set values determined by correcting the initial standard set values include at least phases of on-off operation of the retaining pin of A weft measuring and storing device of the loom, phases of on-off operation of a picking nozzle of the loom or the pressure of a picking fluid of the loom.

* * * * *